(12) United States Patent
Fogal, Sr. et al.

(10) Patent No.: US 7,712,840 B2
(45) Date of Patent: May 11, 2010

(54) UNIFORMITY AND STABILIZING SYSTEM FOR A TIRE/WHEEL ASSEMBLY

(76) Inventors: Robert D. Fogal, Sr., 15 Kenwood Rd., Chambersburg, PA (US) 17201; Robert D. Fogal, Jr., 99 Springfield Rd., Newville, PA (US) 17241

( * ) Notice: Subject to any disclaimer, the term of this patent is extended or adjusted under 35 U.S.C. 154(b) by 0 days.

(21) Appl. No.: 11/626,145

(22) Filed: Jan. 23, 2007

(65) Prior Publication Data

US 2007/0126279 A1 Jun. 7, 2007

Related U.S. Application Data

(63) Continuation-in-part of application No. 11/559,604, filed on Nov. 14, 2006, now abandoned, which is a continuation-in-part of application No. 11/276,867, filed on Mar. 17, 2006, now Pat. No. 7,134,731, which is a continuation-in-part of application No. 11/306,397, filed on Dec. 27, 2005, now Pat. No. 7,192,096, which is a continuation of application No. 10/806,671, filed on Mar. 23, 2004, now Pat. No. 6,979,060.

(60) Provisional application No. 60/766,560, filed on Jan. 27, 2006, provisional application No. 60/488,634, filed on Jul. 18, 2003.

(51) Int. Cl.
   *F16F 15/20* (2006.01)
(52) U.S. Cl. ............... 301/5.22; 301/5.21; 74/573.1
(58) Field of Classification Search ............ 301/5.21, 301/5.22; 74/572.2, 573.1, 574.4; 181/207, 181/209; 295/6, 7
See application file for complete search history.

(56) References Cited

U.S. PATENT DOCUMENTS

| 1,622,469 | A | * | 3/1927 | Walter | ............................ 295/7 |
| 1,860,216 | A | | 5/1932 | Ash | |
| 1,906,925 | A | * | 5/1933 | Edwards | ..................... 74/573.1 |
| 1,976,546 | A | | 10/1934 | Doerr | |
| 2,024,375 | A | * | 12/1935 | Latshaw | ........................ 295/7 |
| 2,485,936 | A | | 10/1949 | Stroberg | |
| 2,525,781 | A | | 10/1950 | Remer | |

(Continued)

FOREIGN PATENT DOCUMENTS

EP        0 559 999    *   9/1993

(Continued)

OTHER PUBLICATIONS

China Academic Journal Electronic Publishing House; 1990; pp. 97-101; vol. 4.

(Continued)

*Primary Examiner*—Russell D Stormer
(74) *Attorney, Agent, or Firm*—Hahn Loeser & Parks LLP

(57) ABSTRACT

A uniformity and stabilizing system comprising a stabilizing ring used in conjunction with a balanced tire wheel assembly wherein the stabilizing ring destroys, absorbs, and dampens vibrations including those caused by non-uniformities in the tire. The stabilizing ring comprises either a solid ring or a cartridge having at least one interior chamber, the interior chamber filled with a flowable media. The stabilizing ring may be used in combination with balance weights.

20 Claims, 17 Drawing Sheets

U.S. PATENT DOCUMENTS

| | | | |
|---|---|---|---|
| 2,632,673 A | | 3/1953 | Pfeiffer |
| 2,660,475 A | * | 11/1953 | Ormsby ..................... 301/5.22 |
| 2,687,918 A | | 8/1954 | Bell et al. |
| 2,737,420 A | | 3/1956 | Wilborn |
| 2,771,240 A | | 11/1956 | Gurin |
| 2,801,883 A | * | 8/1957 | Householder .............. 301/5.22 |
| 3,006,690 A | | 10/1961 | Pierce |
| 3,012,820 A | | 12/1961 | King |
| 3,063,754 A | | 11/1962 | Pierce |
| RE25,383 E | * | 5/1963 | Morrill ...................... 301/5.22 |
| 3,094,003 A | | 6/1963 | Hemmeter |
| 3,166,356 A | | 1/1965 | Sutherland et al. |
| 3,177,039 A | | 4/1965 | Skidmore |
| 3,202,459 A | * | 8/1965 | Pierce ....................... 301/5.22 |
| 3,314,726 A | | 4/1967 | Rehnborg et al |
| 3,316,021 A | | 4/1967 | Salathiel |
| 3,346,303 A | | 10/1967 | Wesley |
| 3,376,075 A | | 4/1968 | Mitchell |
| 3,427,077 A | | 2/1969 | Cole et al. |
| 3,462,198 A | | 8/1969 | Onufer |
| 3,463,551 A | | 8/1969 | Clay |
| 3,464,738 A | * | 9/1969 | Pierce ....................... 301/5.22 |
| 3,724,904 A | * | 4/1973 | Nixon et al. ............... 301/5.22 |
| 3,730,457 A | | 5/1973 | Williams et al. |
| 3,733,923 A | | 5/1973 | Goodrich et al |
| 3,799,618 A | * | 3/1974 | Martinoli ................... 301/5.21 |
| 3,799,619 A | | 3/1974 | Labarber |
| 3,897,977 A | | 8/1975 | de Meurisse |
| 3,913,980 A | | 10/1975 | Cobb et al. |
| 3,953,074 A | | 4/1976 | Cox |
| 4,178,041 A | | 12/1979 | Rush |
| 4,254,985 A | * | 3/1981 | Kirschner ..................... 295/7 |
| 4,269,451 A | | 5/1981 | Narang |
| 4,388,841 A | | 6/1983 | Gamble |
| 4,674,356 A | | 6/1987 | Kilgore |
| 4,873,888 A | * | 10/1989 | Matsuyama ................. 74/573.1 |
| 5,048,367 A | | 9/1991 | Knowles |
| 5,073,217 A | | 12/1991 | Fogal |
| 5,253,928 A | | 10/1993 | Patti |
| 5,350,220 A | * | 9/1994 | Atwell, Jr. ................. 301/5.21 |
| 5,421,642 A | | 6/1995 | Archibald |
| 5,429,422 A | | 7/1995 | Baldi |
| 5,449,054 A | * | 9/1995 | Wiese et al. ............... 188/296 |
| 5,495,879 A | * | 3/1996 | Cabestrero ................. 152/415 |
| 5,503,464 A | | 4/1996 | Collura |
| 5,829,318 A | * | 11/1998 | Hannah et al. ............. 74/570.2 |
| 5,870,908 A | | 2/1999 | Rushlow |
| 5,941,133 A | * | 8/1999 | Wierzba et al. ............ 74/570.2 |
| 6,095,299 A | | 8/2000 | Peinemann et al. |
| 6,161,450 A | * | 12/2000 | Sandig ...................... 74/574.4 |
| 6,267,450 B1 | | 7/2001 | Gamble |
| 6,442,782 B1 | | 9/2002 | Vande Haar |
| 6,550,868 B2 | * | 4/2003 | Kobayashi et al. ......... 301/6.91 |
| 6,581,658 B2 | | 6/2003 | Nakajima et al. |
| 6,672,148 B2 | | 1/2004 | Kunsch |
| 6,719,374 B2 | | 4/2004 | Johnson |
| 6,907,800 B1 | * | 6/2005 | Inman .......................... 74/5.4 |
| 6,979,060 B2 | | 12/2005 | Fogal, Sr. et al. |
| 7,134,731 B2 | | 11/2006 | Fogal, Sr. et al. |
| 7,192,096 B2 | | 3/2007 | Fogal et al. |
| 2004/0095012 A1 | | 5/2004 | Naruse et al. |
| 2006/0226696 A1 | * | 10/2006 | Jones ........................ 301/5.22 |

FOREIGN PATENT DOCUMENTS

| | | |
|---|---|---|
| EP | 0559999 | 9/1993 |
| GB | 1359462 | 7/1974 |
| GB | 1440186 | 6/1976 |
| JP | 55 139542 | 10/1980 |
| JP | 07-231624 A | 8/1995 |
| WO | 2005/009759 A3 | 9/2005 |

OTHER PUBLICATIONS

Adolfsson, Jesper, "A Study of Stability in AutoBalancing Systems using Multiple Correction Masses", Licentiate Thesis, Stockholm, 1997. TRITA-MEK Technical Report, 1997:3, ISSN 0348-467X.

Friend, R.D. and Kinra, V.K., "Particle Impact Damping," Journal of Sound and Vibration (2000). vol. 233(1), pp. 93-118.

International Search Report Form PCT/ISA/210.

International Written Opinion Form PCT/ISA/237.

Walker, J.C. and Reeves N. H., "Uniformity of Tires at Vehicle Operating Speeds," Tire Science and Technology, TSTCA, vol. 2, No. 3, Aug. 1974, pp. 163-178.

Dorfi, H.R., "Tire Non-Uniformities and Steering Wheel Vibrations," Tire Science and Technology, TSTCA, vol. 33, No. 2, Apr.-Jun. 2005, pp. 64-102.

Stutts, D.S., Soedel, W., and Jha, S.K., "Force-Aft Forces in Tire-Wheel Assemblies Generated by Unbalances and the Influences of Balancing," Tire Science and Technology, TSTCA, vol. 19, No. 3, Jul.-Sep. 1991, pp. 142-162.

Frank, J.E., et al., "Passive Control of Tire Vibration with a Dry Polymer Additive: Experiments and Analysis," ASME Proceedings of the International 2003 DETC, Symposium on Vibration and Noise Control—Active, Passive or Hybrid, ASME 19th Biennial Conference on Mechanical Vibration and Noise, Sep. 2-6, 2003, Chicago, Illinois.

Yang, et al, "Attenuation of High Amplitude Vibrations with Particle Dampers", Proceedings of 2002 ASME International Mechanical Engineering Congress and Exposition, Nov. 17-22, New Orleans, LA.

* cited by examiner

US 7,712,840 B2

UNIFORMITY AND STABILIZING SYSTEM FOR A TIRE/WHEEL ASSEMBLY

This application is a continuation-in-part of U.S. non-provisional patent application Ser. No. 11/559,604, filed Nov. 14, 2006, now abandoned, which is a continuation-in-part of U.S. non-provisional patent application Ser. No. 11/276,867, filed Mar. 17, 2006, now U.S. Pat. No. 7,134,731, issued Nov. 14, 2006, which is a continuation-in-part of U.S. non-provisional patent application Ser. No. 11/306,397, filed Dec. 27, 2005, now U.S. Pat. No. 7,192,096, which is a continuation of U.S. non-provisional patent application Ser. No. 10/806,671, filed Mar. 23, 2004, now U.S. Pat. No. 6,979,060, issued Dec. 27, 2005, which claims the benefit of U.S. provisional patent application Ser. No. 60/488,634, filed Jul. 18, 2003, all of which are hereby incorporated by reference. This application also claims the benefit of U.S. provisional patent application Ser. No. 60/766,560, filed Jan. 27, 2006, hereby incorporated by reference.

TECHNICAL FIELD

This invention relates to a uniformity and stabilizing system for dampening the effects of vibration on a tire/wheel assembly of a motor vehicle, and more particularly to a uniformity and stabilizing system comprising a stabilizing ring used in conjunction with a balanced tire wheel assembly wherein the stabilizing ring destroys, absorbs, and dampens vibrations including those caused by non-uniformities in the tire.

BACKGROUND OF THE INVENTION

A typical motor vehicle is generally characterized as comprising an unsprung mass and a sprung mass. The unsprung mass generally consists of all of the parts of the vehicle not supported by the vehicle suspension system such as the tire/wheel assembly, steering knuckles, brakes and axles. The sprung mass, conversely is all of the parts of the vehicle supported by the vehicle suspension system. The unsprung mass can be susceptible to disturbances and vibration from a variety of sources such as worn joints, misalignment of the wheel, brake drag, irregular tire wear, etc. Because vehicular tires support the sprung mass of a vehicle on a road surface and such tires are resilient, any irregularities in the uniformity or dimensions of the tire, any dimensional irregularities in the wheel rim, and/or any dynamic imbalance or misalignment of the tire/wheel assembly will cause disturbances and vibrations to be transmitted to the sprung mass of the vehicle thereby producing an undesirable or rough vehicle ride, as well as reducing handling and stability characteristics of the vehicle. Severe vibration can result in dangerous conditions such as wheel tramp or hop and wheel shimmy (shaking side-to-side).

It is now standard practice to reduce these adverse vibrational effects by balancing the wheel rim and tire assembly by using a balance machine and clip-on lead weights or lead tape weights. The lead balance weights are placed on the rim flange of the wheel and clamped in place in a proper position, or adhered to the wheel in the case of tape weights, as directed by the balancing machine. In general terms, balance is the uniform distribution of mass about an axis of rotation, where the center of gravity is in the same location as the center of rotation. A balanced tire/wheel assembly is one where the mass of the tire/wheel assembly mounted on the vehicle's axle is uniformly distributed around the axle. Balancing is an improvement and will reduce the vibration of the tire/wheel assembly in comparison to an unbalanced tire/wheel assembly.

Another method of balancing is provided by balancing rings. Balancing rings typically comprise a 360 degree annular tube partially filled with weights (typically less than 50% of the tube) in combination with a damping fluid which typically fills the remainder of the tube. The tubes are typically attached adjacent the wheel flange. The most common commercial balancing ring is produced by Centramatic, which uses steel shot in oil. The balance ring works by making use of centrifugal force to distribute the steel shot inside the tube to compensate for dynamic tire balance. As the tire/wheel assembly rotates, the steel shot in the tube will flow away from a heavy spot of the tire until such time as the out of balance situation is corrected. The centrifugal force holds the weight against the outside of the balancing tube. The key to balancing rings is that the weight in the ring must be able to move within the tube to counter the heavy spot of the tire. Therefore a balance ring does not have a constant mass about its circumference, either at rest or in use on a tire/wheel assembly.

However, even perfect balancing of the tire/wheel assembly does not necessarily mean that the tire will roll smoothly. Even a perfectly balanced tire can have severe vibrations due to non-uniformities in the tire which result in unequal forces within the tire footprint.

A level of non-uniformity is inherent in all tires. In the art of manufacturing pneumatic tires, rubber flow in the mold or minor differences in the dimensions of the belts, beads, liners, treads, plies of rubberized cords or the like, sometimes cause non-uniformities in the final tire. When non-uniformities are of sufficient magnitude, they will cause force variations on a surface, such as a road, against which the tires roll and thereby produce vibrational and acoustical disturbances in the vehicle upon which the tires are mounted. Regardless of the cause of the force variations, when such variations exceed the acceptable minimum level, the ride of a vehicle utilizing such tires will be adversely affected.

While gains have been made in the ability of the average tire shop to diagnose, measure, and correct vibration of a tire/wheel assembly due to imbalance, run out, and non-uniformity force variations, there remains a need in the art to provide stability to the unsprung mass of the vehicle to combat tires that may have excessive force variations due to non-uniformity. It is unrealistic to believe or expect that all of the tires that do not meet the radial force limitations of the vehicle will not find their way onto a vehicle. Accordingly, it would be an advantage to provide a uniformity and stabilizing system to help improve the performance of the population of tire/wheel assemblies as a whole.

SUMMARY OF THE INVENTION

At least one advantage over the prior art is provided by a uniformity and stabilizing system for a tire/wheel assembly comprising: a wheel; a tire mounted on the wheel; and at least one annular stabilizing ring made of a weight material, the stabilizing ring having an approximately constant mass around its arcuate circumference, and being affixed to a non-pressurized side of the wheel such that the stabilizing ring and the wheel are coaxial.

At least one advantage is also provided by a uniformity and stabilizing system for a tire/wheel assembly comprising: a wheel rim; a tire mounted on the wheel rim; and at least one stabilizing ring comprising an annular cartridge comprising an interior chamber completely filled with a weight material, the stabilizing ring having an approximately constant mass around its circumference, and being affixed to a non-pressurized side of the wheel such that the stabilizing ring and the wheel are coaxial.

An advantage is also provided by a method of stabilizing a tire/wheel assembly comprising the steps of: providing a tire/wheel assembly; using force variation measuring equipment to determine a radial force value of the tire/wheel assembly; providing at least one stabilizing ring comprising an approximately constant mass around its circumference, wherein the mass is directly proportional to the measured radial force value of the tire/wheel assembly; and attaching the stabilizing ring to a non-pressurized side of a tubewell of the wheel or a rim flange of the wheel.

These and other advantages will be apparent upon a review of the drawings and detailed description of the invention.

BRIEF DESCRIPTION OF THE DRAWINGS

This invention will now be described in further detail with reference to the accompanying drawings, in which.

DETAILED DESCRIPTION

Figure 1:
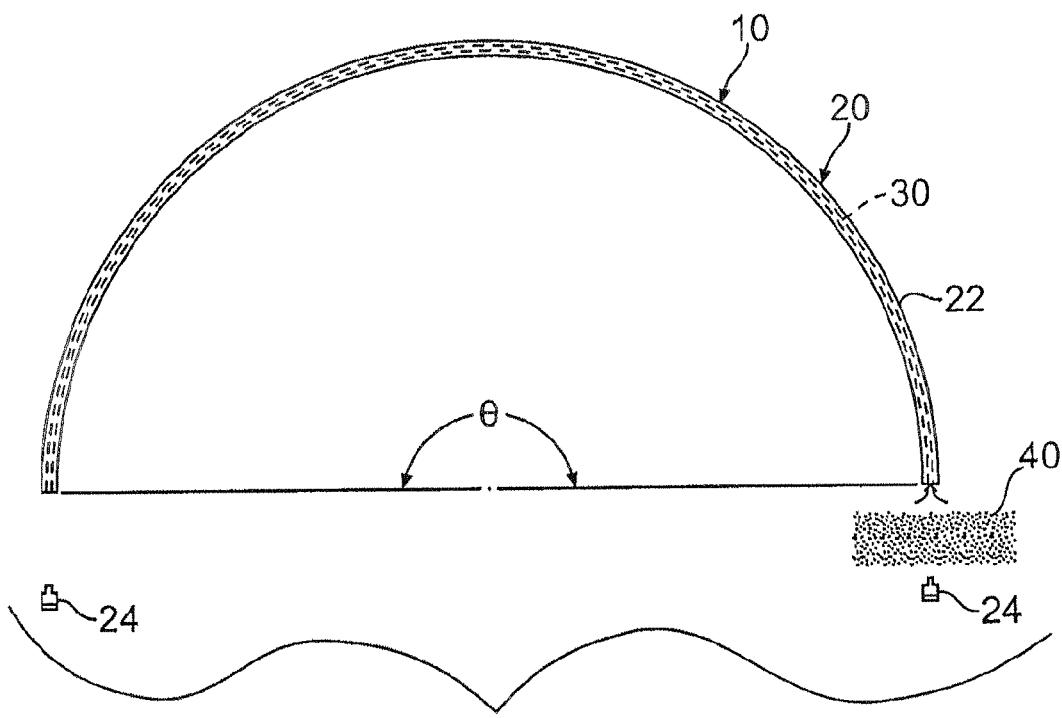
FIG. 1 is an exploded side view of the balance weight of the present invention.
Figure 2:
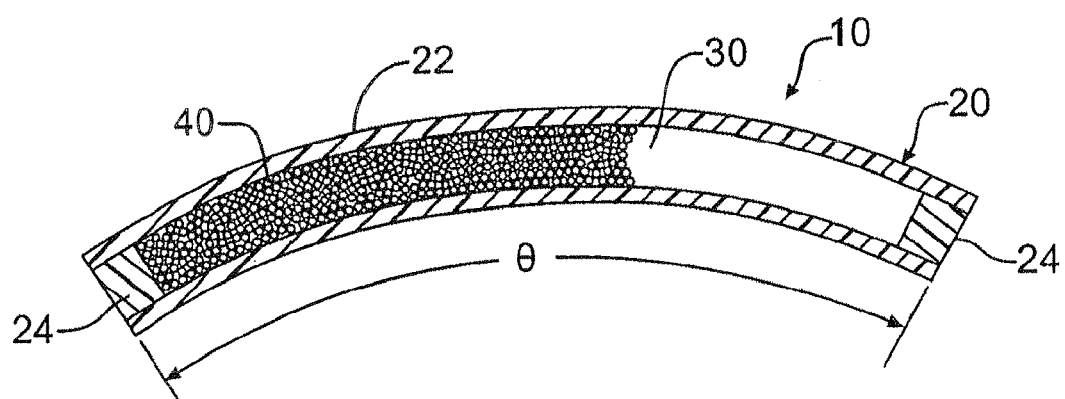
FIG. 2 is a longitudinal cross-sectional view of an assembled balance weight of the present invention.

This invention will now be described in detail with reference to various embodiments thereof. The first embodiments relate to the balance weight cartridge of earlier related parent applications. The stabilizer ring, which is the focus of the present application, is intended to be used in conjunction with the cartridge balance weights in at least one embodiment of the invention. Referring now to FIGS. 1 and 2, an exploded view and an assembled cross-sectional view, respectively, a balance weight 10 is shown comprising a hollow body or cartridge 20 having a interior chamber 30 at least partially filled with a flowable media 40.

The cartridge 20 forms a container and is typically made of a molded or extruded rubber or plastic material that will not react with the metallic surface of a wheel, however the cartridge 20 is not intended to be limited to such materials and any suitable material such as a fabricated aluminum cartridge is also contemplated. The cartridge 20 comprises a tube 22 that may be cut or molded to the desired length. The flowable media 40 is inserted in the tube 22 which is then sealed, most commonly with at least one plug 24 or a heat weld seal may also be used. The cartridge 20 may be formed in a rigid longitudinally arcuate section of an angle Θ equivalent to an angle of one hundred eighty degrees or less, or it may be formed in a flexible straight section and positioned into an arcuate section of one hundred eighty degrees or less when attached to a wheel as described in greater detail below. The walls of the tube 22 which make up the interior chamber 30 should be of a smooth surface finish that will promote flow of the flowable media 40.

Figure 3A:
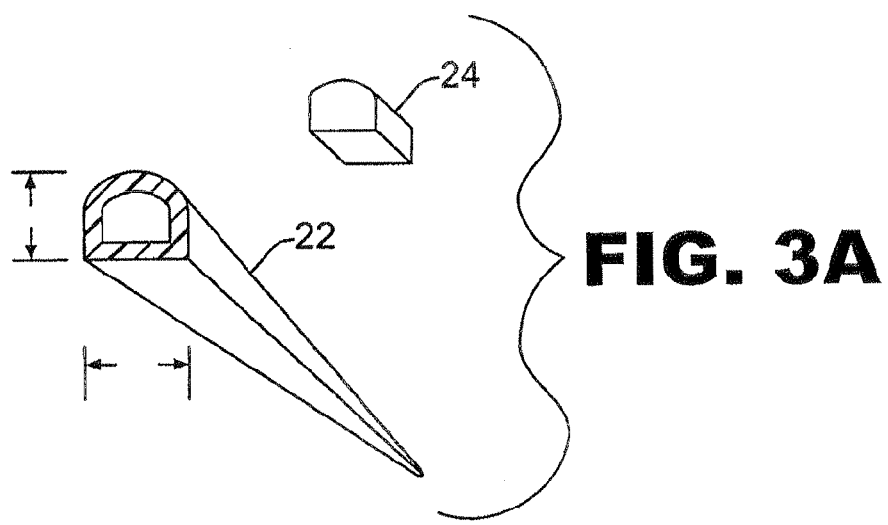
FIGS. 3A-3C are various perspective views of the cartridge of the present invention showing the cross sectional end of the tube and associated plugs of the present invention.
Figure 3B:
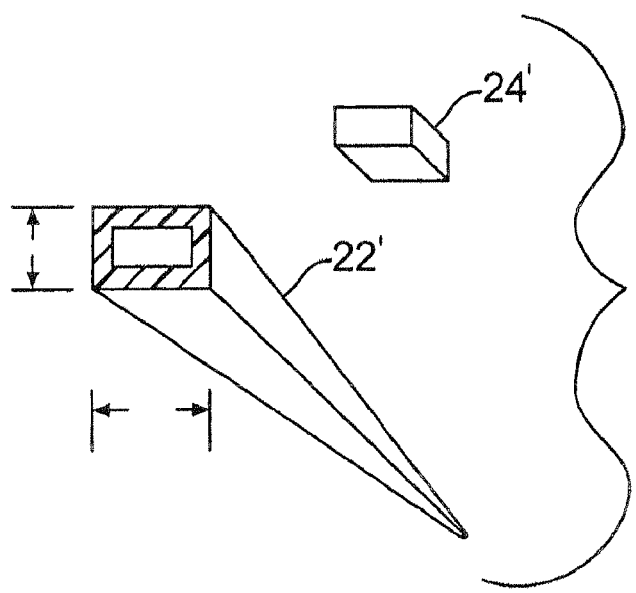
Figure 3C:
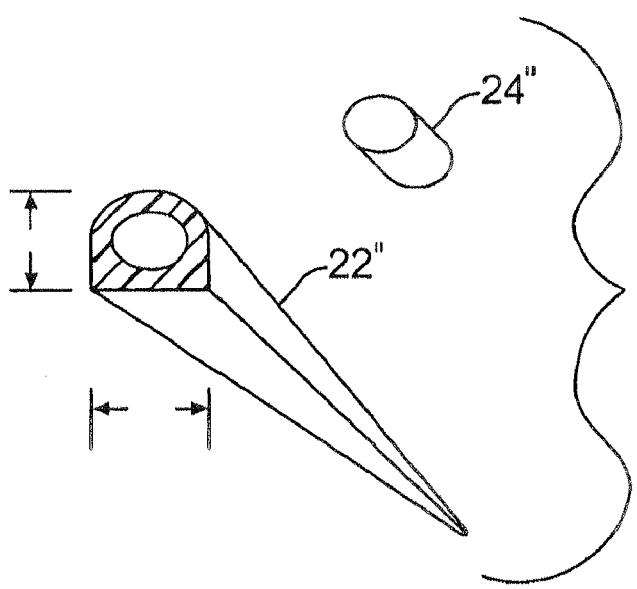

Some possible variations of the tube 22 used for the cartridge 20 are shown in FIGS. 3A-3C, wherein the cross-section of the tube 22 may be shaped as a "D" and corresponding plug 24 as shown in FIG. 3A or tube 22' may be shaped as a rectangle and corresponding plug 24' as shown in FIG. 3B. Alternatively, the interior chamber 30 of the tube 22" may have an oval cross-section and corresponding plug 24" as shown in FIG. 3C. These embodiments are provided as examples only and are not intended to limit the scope of the invention to the particular examples shown herein. It is contemplated that any suitable cross-sectional shape may be used for the tube 22 and interior chamber 30 that does not inhibit the flow of the flowable material 40. It is also contemplated that the physical exterior dimension or height of the tube does not interfere with other systems positioned near the tire/wheel assembly such as the braking system, etc.

Figure 4:
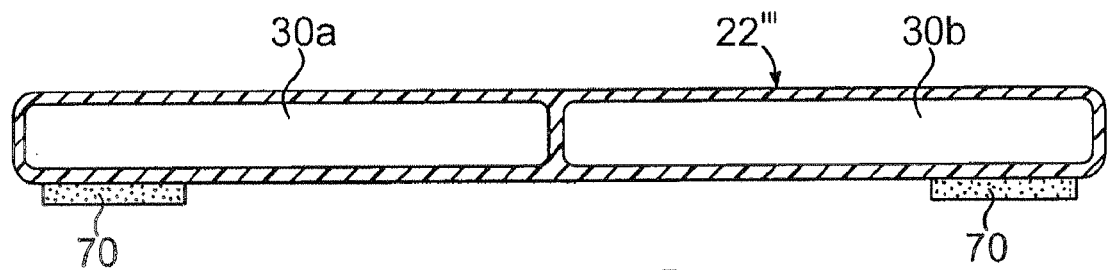
FIG. 4 is a cross-sectional view of another embodiment of the of the cartridge balance weight showing a low profile, multi-chamber configuration having adhesive attachment strips.

Another variation of tube is shown in FIG. 4. Tube 22''' employs a low-profile configuration which enables the tube 22''' to be positioned on the inboard side of the wheel without contacting the brake components. Tube 22''' also provides a relatively large chamber cross-sectional area to enable a larger amount of balance media to be used and to allow movement of the media in both a circumferential direction as well as a lateral direction to better balance the wheel in two planes. Adhesive strips 70 are provided on the exterior of tube 22''' to provide means for attaching the tube to the wheel. Tube 22''' may also have more than one chamber 30 as shown in FIG. 4 and designated as 30a and 30b. The multiple chambers 30a, 30b will help provide structural rigidity of the chambers 30a, 30b by providing an interior wall to support the relatively long cross-sectional width or span of tube 22'''. The incorporation of multiple chambers will also limit the lateral movement of the media between chambers 30a, 30b which in some instances may help the media to better balance the wheel by preventing all of the media from migrating to one side of the tube 22''' when the wheel well is formed at an angle to the ground.

The flowable material 40 may be metallic balls as best shown in FIGS. 1, 2, 5 and 6, preferably stainless-steel, however any suitable flowable material is contemplated by the present invention including beads, shot, particles, powders, etc. made of ferrous and non-ferrous metals, ceramics, plastics, glass beads, alumina, etc. It is also contemplated that the flowable material may be a liquid, in whole or in part. Such suitable materials include any material that is stable and remains free flowing over all operating conditions of the tire/wheel assembly. The size of the individual material of the flowable material 40 must be small enough that it can flow in an interior chamber 30 having a relatively small height. Although not shown, it is contemplated that the flowable material may include an optional lubricating agent such as talc or graphite, which may help the material enhance and/or retain its flowable characteristics.

The amount of flowable material 40 within the balance weight 10 should be sufficient to enable the balance weight 10 to balance the tire/wheel assembly. In use, the balance weight 10 is preferably applied in the same manner as a standard lead balance weight using a spin balance machine. The tire/wheel assembly is mounted on the spin balancer and the out of balance condition is detected. The spin balancer recommends an amount of weight to be positioned at a particular circumferential position and at a particular predetermined distance from the axis in one or more predetermined planes. When using balance weight 10 of the present invention, the total weight of the balance weight 10 (including the cartridge 20 and flowable material 40) should be equivalent to the amount of weight called for by the balance machine. Therefore the arc length of the cartridge 20 and the amount of flowable media 40 will be proportional to the specified weight with larger imbalances requiring a larger cartridge arc length and more flowable media 40, and vise versa. It is generally contemplated that the amount of flowable material 40 used in a cartridge 20 will vary between 5 to 95 percent of the volume of the internal chamber 30. In one embodiment of the invention, the amount of flowable material 40 as shown is approximately two-thirds of the volume of the internal chamber 30, which has been shown to provide optimized dynamic balancing during current testing, however any amount sufficient to allow the flowable material to sufficiently move and balance the tire/wheel assembly is contemplated. In some applications where the lead balance weight is merely replaced, the entire volume of the interior chamber can be filled with material 40 such that the balance weight 10 acts as a fixed weight.

The prior art lead balance weights are fixed in position by an operator as directed by the spin balance machine. The lead balance weights may be attached to the wheel slightly off position by the operator. This requires the operator to rebalance. Additionally, once the tire/wheel assembly is in operation on the vehicle, tire wear, pot holes, etc. will cause the tire/wheel assembly to go out of balance. In contrast, the balance weight 10 of the present invention allows the weight of the flowable media 40 to move circumferentially as well as laterally within the cartridge 20. The operator attempts to center the balance weight 10 of the present invention at the location specified by the spin balance machine. If the operator misses the exact location slightly, the flowable media 40 is able to adjust the effective balance location of the tire/wheel assembly by moving within the cartridge 20 to obtain a balance equilibrium. Accordingly, the balance weight operator need not be as accurate, and the tire/wheel assembly stays in balance even during operation of the tire/wheel assembly as the balance location moves along the wheel. It is also contemplated that more than one balance weight 10 may be used in the present invention—just as with the prior art lead balance weights.

The balance weights of the present invention may be located on the wheel using a marking tool as disclosed by U.S. application Ser. No. 11/164,717, filed on Jan. 12, 2006 now abandoned, and hereby incorporated by reference. The operator can use the marking tool to make a straight line on the wheel to provide a reference for accurately placing the weight.

Figure 5:
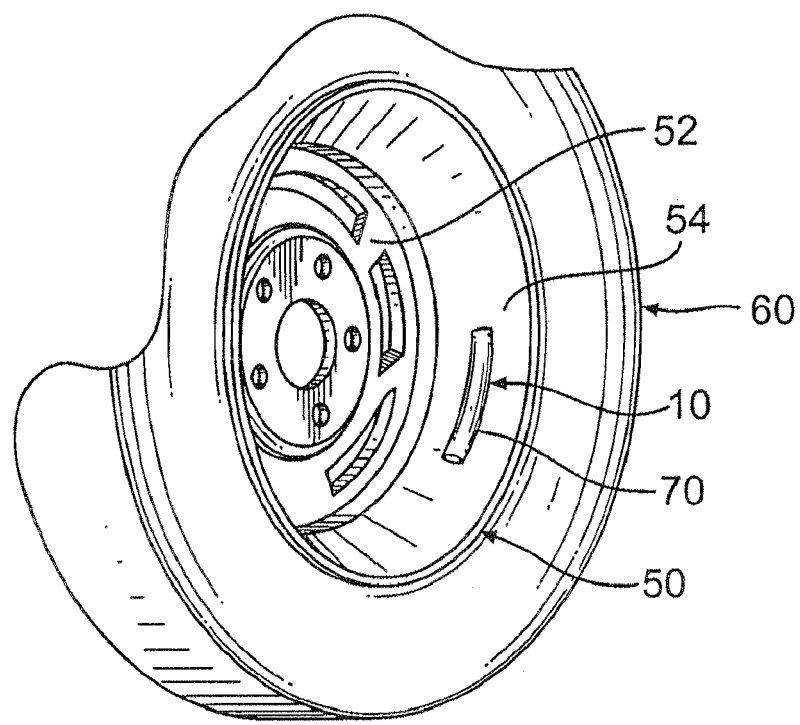
FIG. 5 is a perspective view of an embodiment of the of the cartridge balance weight attached to the brake side of the tube well of a tire/wheel assembly.

Referring now to FIG. 5, an embodiment of the balance weight 10 is shown attached to a wheel 50 of a tire/wheel assembly 60 by an adhesive 70. As previously mentioned, the trend toward the more aesthetic aluminum alloy wheels makes it important that the weight is not visible. Accordingly, one possible placement is that the weight 10 may be attached on the inboard side of the spider 52 along the brake side of the tube well 54 of the wheel 50. The weight 10 may be attached to the tube well 54 using an adhesive 70 similar to that used by tape weights. As used in this embodiment, the balance weights 10 are preferably pre-manufactured to different lengths, or arc lengths, of varying total weights. The balance weight 10 is applied in the same manner as are the tape weights as instructed by the particular balance weight machine (not shown). When attaching weights to the brake side of the tube well 54, some operators will often use single plane balancing using the tire/wheel assembly centerline as "good enough", however most newer balancing machines can still utilize dual plane balancing by providing dual planes along the surface of the brake side of the tube well 54. Direct measure balance weight placement and 360 degree weight placement display capabilities make positioning balance weight 10 both simple and accurate to balance the tire/wheel assembly 60.

Figure 6:
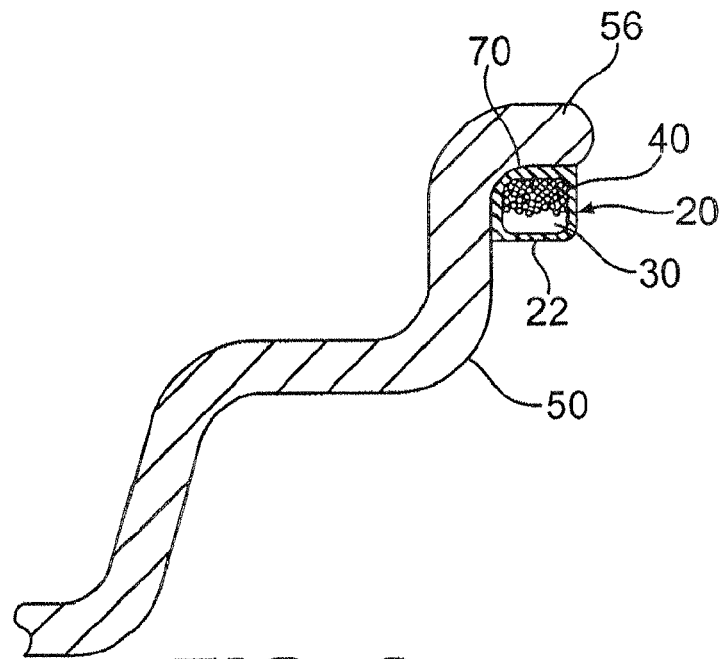
FIG. 6 is a cross-sectional view of an embodiment of the cartridge balance weight attached to the flange of a tire/wheel assembly.

Referring now to FIG. 6, an embodiment of the balance weight 10 is shown attached to an inboard side flange 56 of the wheel 50 of the tire/wheel assembly (not shown) by an adhesive 70. The cartridge 20 is shown having physical dimensions which corresponds to that of the mating surface of the flange 56. In this manner, the balance weight 10 is positioned similar to that of the prior art balancing rings, except that the balance weight has a limited arc length that enables faster balancing and prevents a severe out of balance condition at slower speeds as is inherent with the prior art balancing rings.

Figure 7:
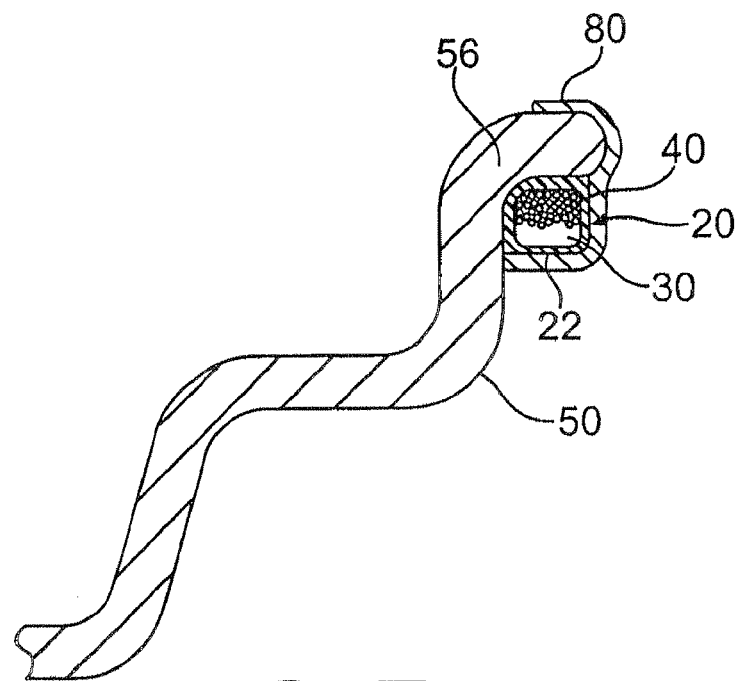
FIG. 7 is a cross-sectional view of a clip-on embodiment of the cartridge balance weight shown attached to the flange of a tire/wheel assembly.

Referring now to FIG. 7, an embodiment of the balance weight 10 is shown attached to an inboard side flange 56 of the wheel 50 by a clip 80. The clip 80 is formed similar to the standard prior art lead balance weight clips and attaches balance weight 10 to a flange 56 of the wheel 50.

The uniformity and stabilizing system for a tire/wheel assembly will now be discussed in detail. While it is contemplated that the balance weight cartridge 10 may be used in conjunction with a uniformity and stabilizing system, the uniformity and stabilizing system can be used with conventional balance weights as well.

Figure 8:
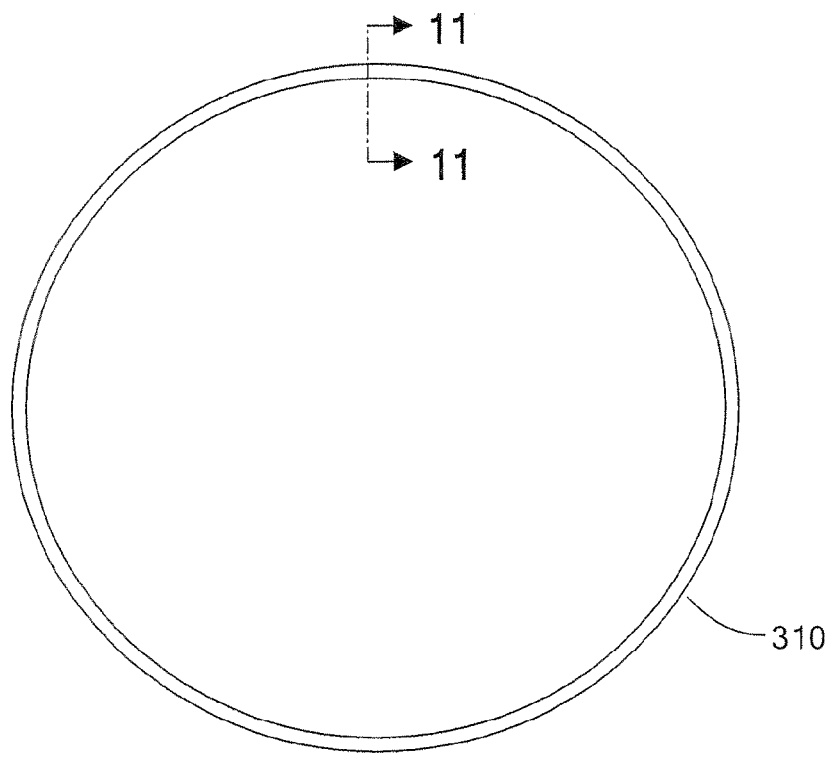
FIG. 8 is a side elevational view of a stabilizing ring in an endless ring embodiment of the present invention.
Figure 9:
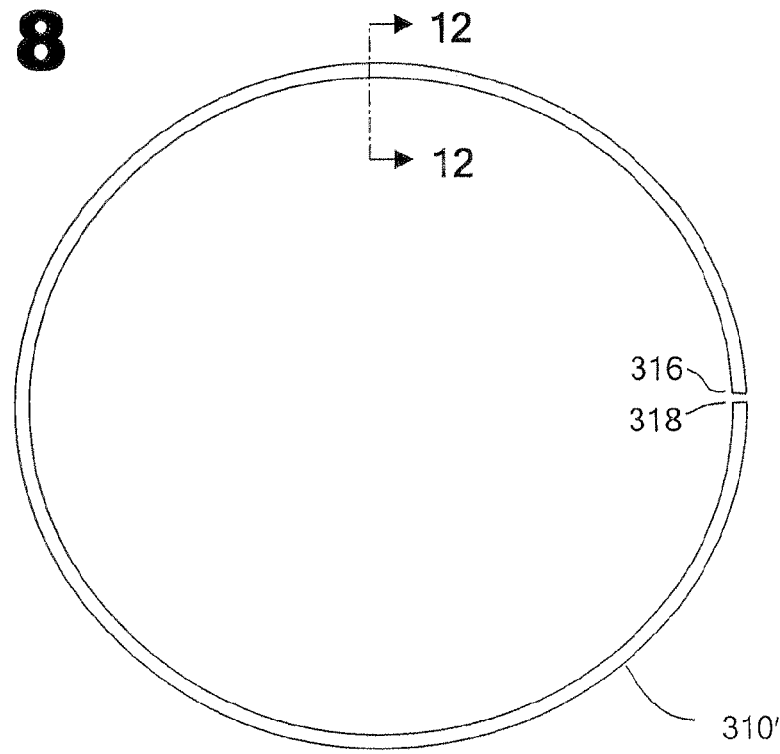
FIG. 9 is a side elevational view of a stabilizing ring in another embodiment of the present invention showing the ring formed as one piece and end to end.
Figure 10:
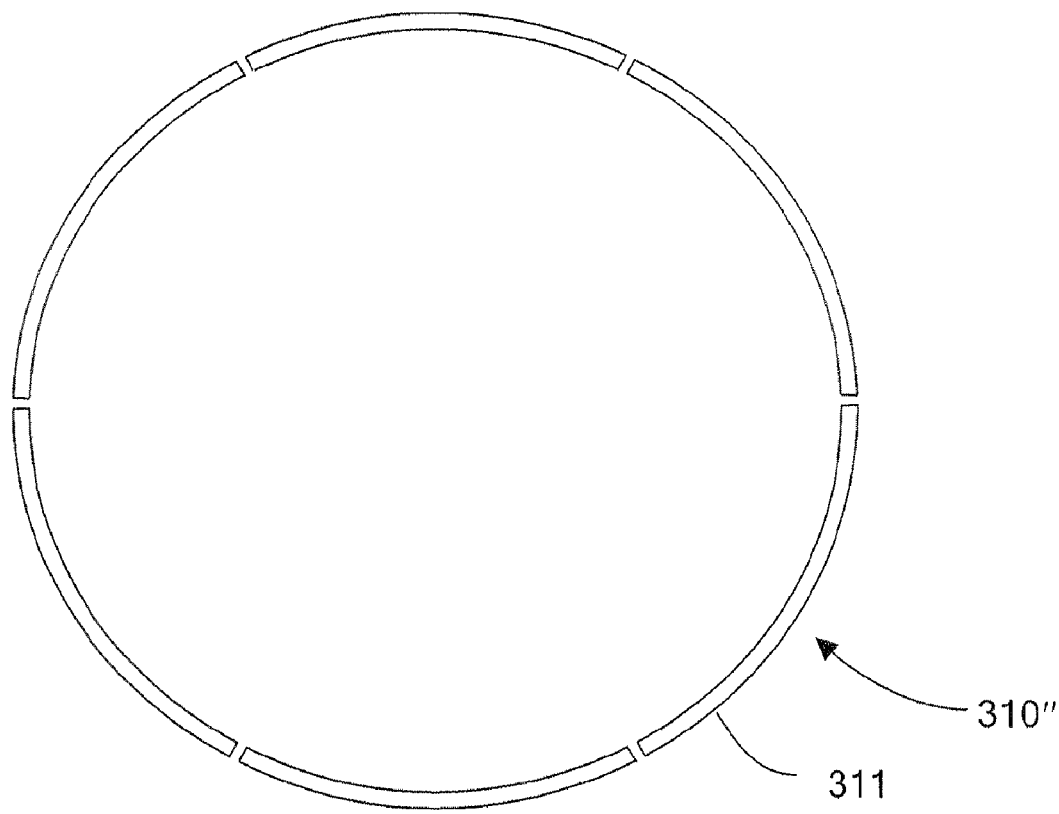
FIG. 10 is a side elevational view of a stabilizing ring in still another embodiment of the present invention showing the ring formed by a plurality of members.

Referring now to FIGS. 8-12, various embodiments of a stabilizing ring 310 of the present invention is shown. The stabilizing ring 310 comprises an annular stabilizing ring made of a weight material, the stabilizing ring having an approximately constant mass around its arcuate circumference. The stabilizing ring 310 may be formed as an endless annular ring as shown in FIG. 8. In another embodiment, the stabilizing ring 310' may comprise a flexible or formable longitudinal section with a first end 316 and a second end 318. When installed on the wheel or tire, the longitudinal section is formed or flexed into a longitudinally arcuate shape about an angle of approximately 360 degrees, such that the ends 316, 318 are approximately adjacent and the stabilizing ring comprises an annular shape on the wheel or tire. The stabilizing ring 310" may also be formed by a plurality of arcuate members 311 positioned end to end to form a single annular ring 310" as shown in FIG. 10.

Figure 11:
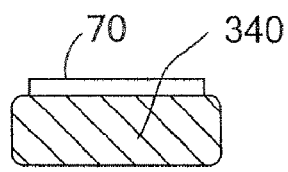
FIG. 11 is a cross-sectional view through section 11-11 of FIG. 8 in one embodiment of the present invention.
Figure 12:
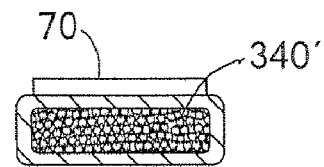
FIG. 12 is a cross-sectional view through section 12-12 of FIG. 9 in a second embodiment of the present invention.

The stabilizing ring 310 comprises an approximately constant mass around the ring when installed on the wheel or tire. When the cross-sectional shape is uniform around the ring, this can be accomplished by using a weight material 340 with an approximately constant mass around the ring. In some embodiments, the distribution of mass through a cross section may not be uniform. In these embodiments, the average area density of the cross section should be approximately constant around the ring to achieve an approximately constant mass around the ring when installed on the wheel or tire. Any suitable cross-sectional shape may be used for the stabilizing ring 310. One low-profile rectangular variation of the cross-sectional shape of the stabilizing ring 310 is shown in FIG. 11. A low-profile section enables the stabilizing ring 310 to be positioned on the brake side of the tubewell without contacting brake components. Alternatively, the cross-sectional shape may be an oval or circular shape. It is contemplated that the cross-section may be shaped to correspond to a particular surface on a wheel for assembly or aesthetic or other reasons. It is also contemplated that the physical exterior dimension or height of the stabilizing ring 310 does not interfere with other systems positioned near the tire/wheel assembly such as the braking system, etc. These embodiments are provided as examples only and are not intended to limit the scope of the invention to these particular examples.

Figure 13:
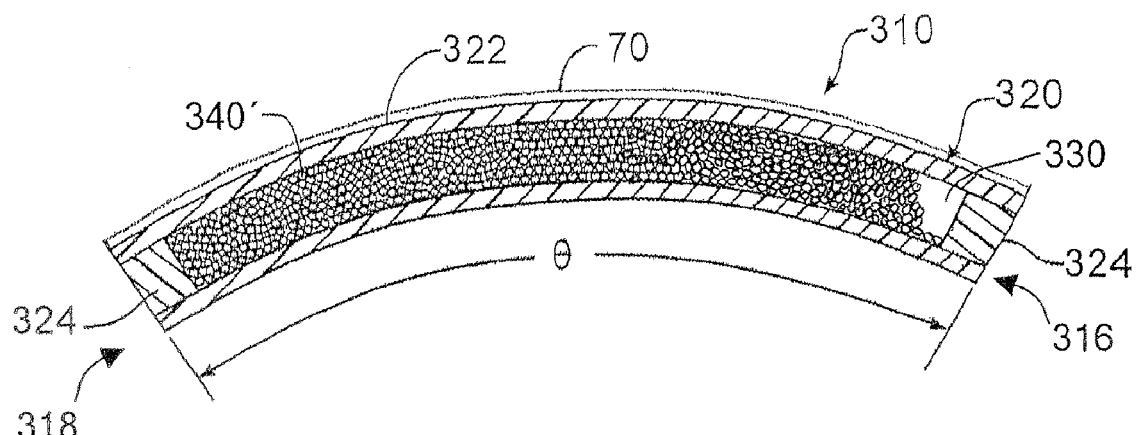
FIG. 13 is a longitudinal cross-sectional view of a stabilizing ring in accordance with FIGS. 9 and 12 of the present invention.

In the embodiment shown by the cross-section of FIG. 11, the stabilizing ring 310 comprises a solid weight material 340 that is formed or molded into the desired cross-sectional profile. In another embodiment indicated by the cross-sections in FIGS. 12 and 13, the stabilizing ring 310 comprises a hollow body or cartridge 320 having an interior chamber 330 filled with the weight material 340. In the embodiment shown in FIGS. 12 and 13, the interior chamber is filled with a flowable weight material 340'. The cartridge 320 forms a container and is typically made of a molded or extruded rubber or plastic material that will not react with the metallic surface of a wheel. However, the cartridge 320 is not intended to be limited to such materials and any suitable material such as a fabricated aluminum or other metal cartridge is also contemplated. The cartridge 320 and inner chamber 330 comprise a tube 322 that may be cut or molded to the desired length. Consequently, the cartridge 320 of this embodiment has a first end 316 and a second end 318.

The solid or flowable weight material 340, 340' is inserted in the tube 322, which is then sealed, most commonly with at least one plug 324. A heat weld seal may also be used to seal the weight material 340, 340' into the inner chamber 330. The ends 316, 318 are approximately adjacent when the stabilizing ring is installed on a wheel or tire. It is contemplated that the first end 316 may be heat welded to the second end 318, or both ends 316, 318 be affixed to the same plug 324 to concurrently seal the weight material 340, 340' into the cartridge and form a continuous arcuate ring shape.

The weight material 340' generally completely fills the cartridge 320. However, as defined here, a completely filled cartridge may have a small volume remaining empty to ensure enough clearance inside the tube 322 to install the plug 324 or to heat weld the ends, accommodating manufacturing tolerances in forming and filling the tube 322. Further, depending on the selected weight material and the materials selected for the cartridge, having a small volume remaining empty may also be necessary to accommodate differences in thermal expansion properties between the materials. The cartridge style stabilizing ring 310 is not intended to directly balance the tire/wheel assembly and the weight material 340' fills the cartridge by over 95% of the total volume such that the weight material retains a substantially constant mass. A cartridge style stabilizing ring 310 filled between 95-100% will not be able to dynamically balance a tire/wheel assembly as a balancing ring can because sufficient mass will not be able to offset any imbalance in comparison to the mass of the remainder of the stabilizing ring.

Alternately, the cartridge 320 may be directly molded around the solid or flowable weight material 340, 340', or directly applied to the weight material 340, 340' by spraying or dipping or other coating methods to encapsulate it. In this embodiment, it is contemplated that the walls of the cartridge 320 in FIG. 12 may be any suitable strength and thickness, ranging from a thin protective or decorative layer, to a robust tube for containing a fluid weight material.

Another variation of the cartridge 320 includes more than one chamber, exemplified by the profile of FIG. 4, each chamber filled with weight material 340, 340'. Inner walls creating multiple chambers will provide additional rigidity and strength. It is contemplated that the density of weight material 340, 340' in one chamber be different than the density of weight material 340, 340' in another chamber.

Weight material 340, 340' may comprise any ferrous or non-ferrous metals such as steel, stainless steel, or lead. Weight material 340, 340' may comprise ceramics, plastics, glass, alumina, or any other suitable material. Flowable weight material 340' may be in the form of a powder, particles, granules, balls, shot, beads, or other small, flowable forms. It is also contemplated that the weight material 340' may be a liquid, in whole or in part, such as oil, or other liquid, as long as the stabilizing ring 310 retains its generally constant mass about its arcuate circumference.

In comparing the solid and cartridge style stabilizing rings 310 it is noted that the solid stabilizing rings offer the best solution for adding the most amount of weight in the smallest package and can typically be more easily and cheaply produced. High density materials such as steel or other metallic materials can be used when a high weight ring is wanted. The higher weight adds to the rotational inertia of the unsprung mass, which adds stability to the system. The cartridge style stabilizing ring allows the use of powders, particles, pellets and the like, which although completely filled in the cartridge, still have the ability for slight movement that helps enable the weight material to absorb and cancel out vibration frequencies of the unsprung mass including those caused by tire non-uniformities.

The stabilizing ring 310 may be installed on the rim flange of the wheel, on the pressurized side of the tubewell, on the non-pressurized side of the tubewell, or in any suitable location on the wheel or tire such that the stabilizing ring is substantially coaxial with the wheel/tire assembly. The stabilizing ring 310 may be attached to a wheel 50 of a tire/wheel assembly 60 by adhesive 70. The stabilizing ring 310 may be attached to the tube well 54 using the adhesive 70, similar to that used by tape weights. In this location the stabilizing ring is not visible, which is important to some customers. In some installation locations, such as a wheel rim or flange, one or more of the clip 80 may be used to install the stabilizing ring 310. The methods of attachment are discussed in greater detail below.

Figure 14:
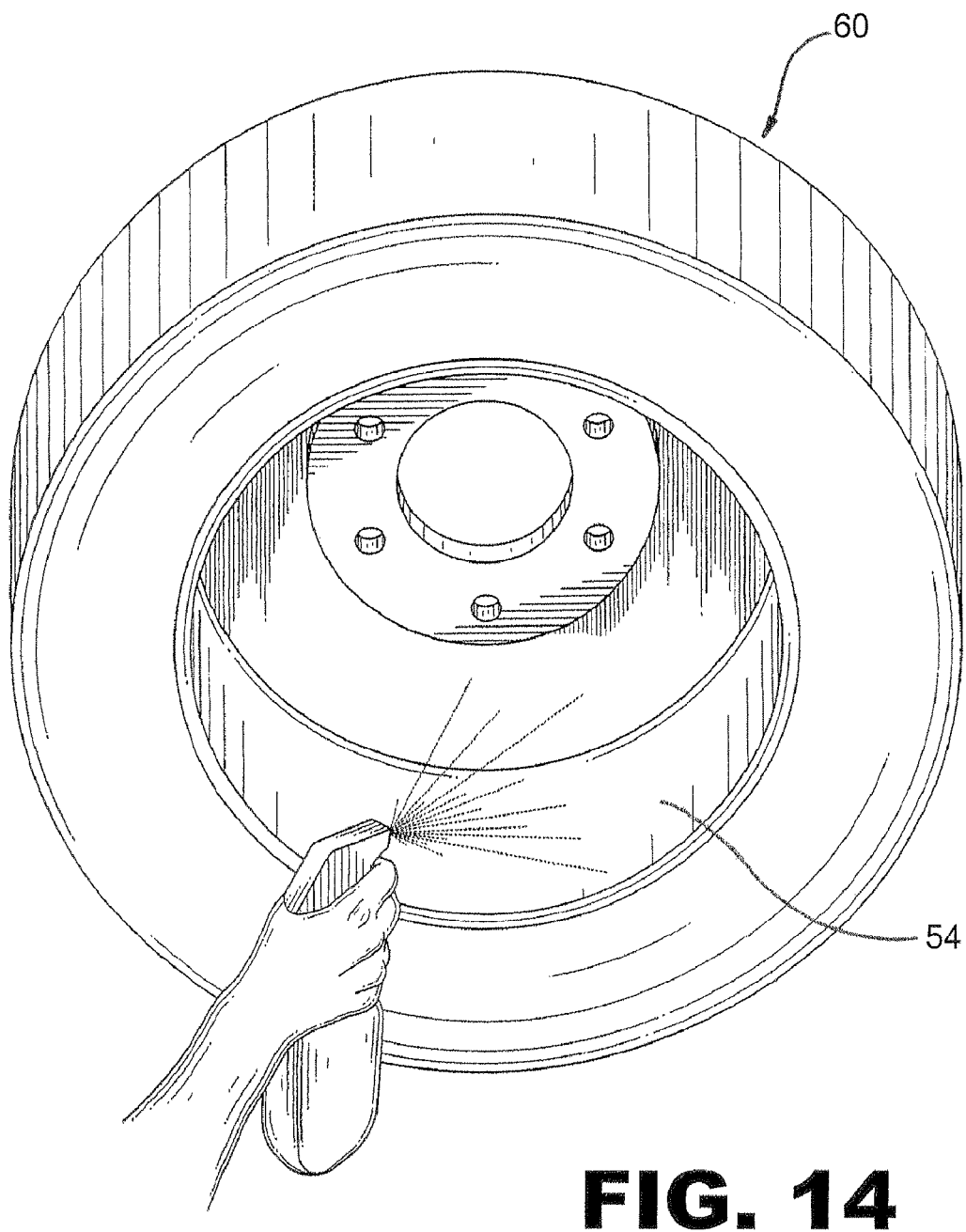
FIG. 14 shows a step of cleaning the brake side or non-pressurized side of the tube well of a tire/wheel assembly.

Referring to FIG. 14, when adhesive attachment is used, the area of attachment of the stabilizing ring is prepared by cleaning to remove any dirt and brake dust that may prevent proper attachment of the stabilizing ring 310 to the wheel 50.

Figure 15:
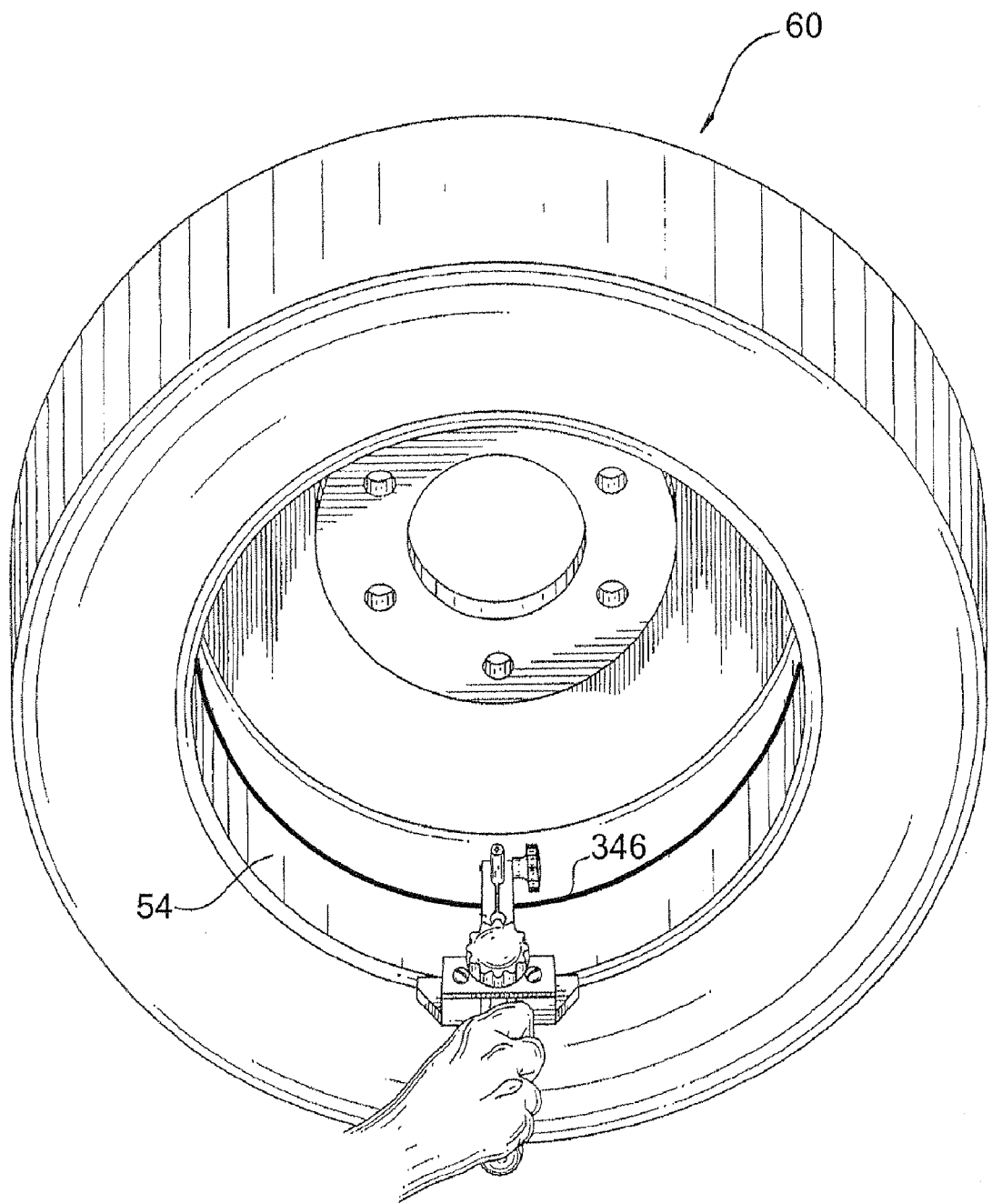
FIG. 15 shows a step of marking a line on the brake side or non-pressurized side of the tube well of a tire/wheel assembly.

The stabilizing ring 310 of the present invention may be located on the wheel using the marking tool as disclosed by U.S. application Ser. No. 11/164,717, filed on Jan. 12, 2006 and as shown in FIG. 15. The operator can use the marking tool to make a straight line 346 on the wheel for aligning the stabilizing ring accurately around the wheel, to ensure that the ring shaped ring is substantially coaxial with the tire/wheel assembly.

Figure 16:
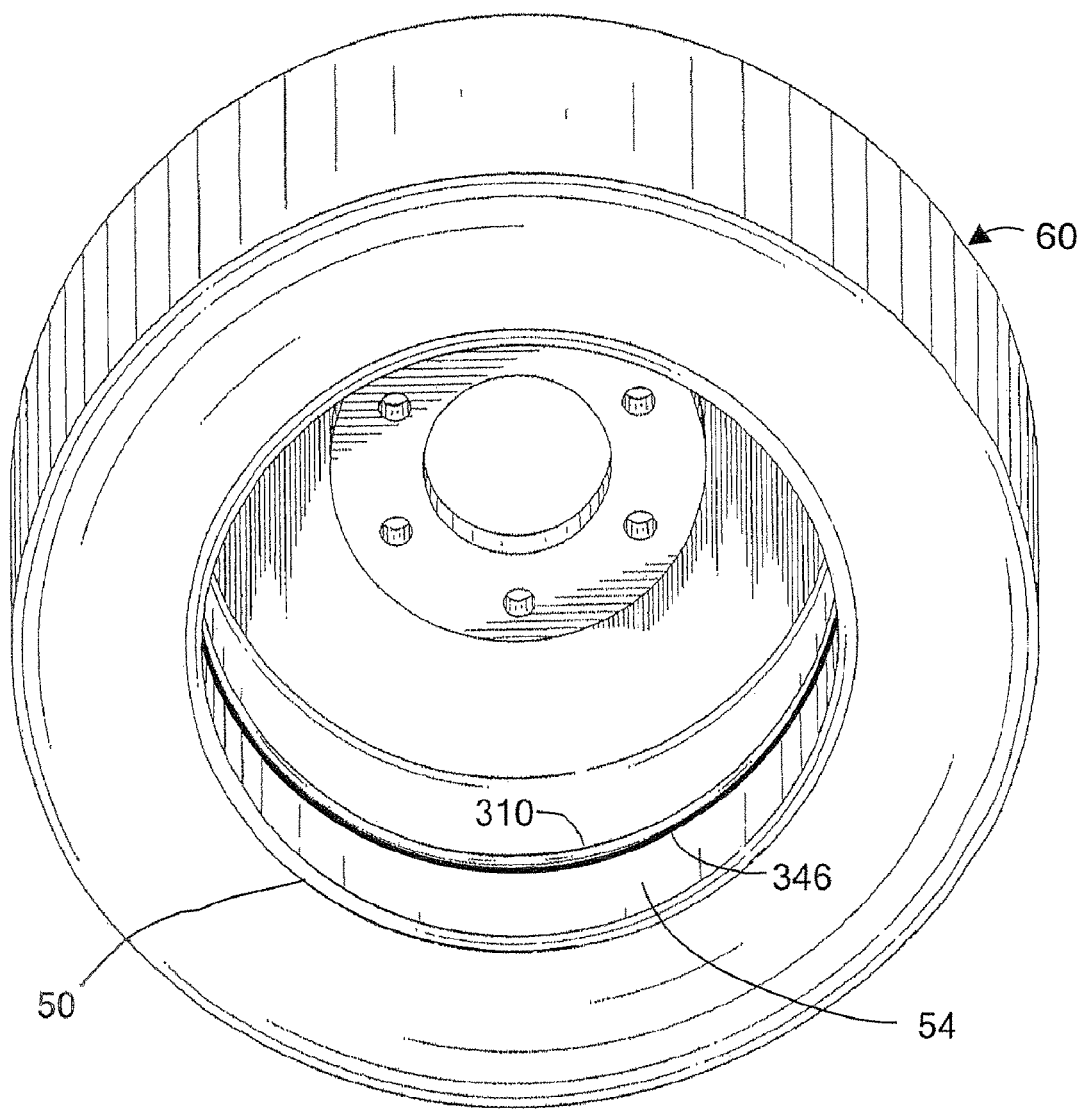
FIG. 16 shows a perspective view of a stabilizer ring of the present invention as shown in FIG. 8 attached to the brake side or non-pressurized side of the tube well of a tire/wheel assembly.
Figure 17:
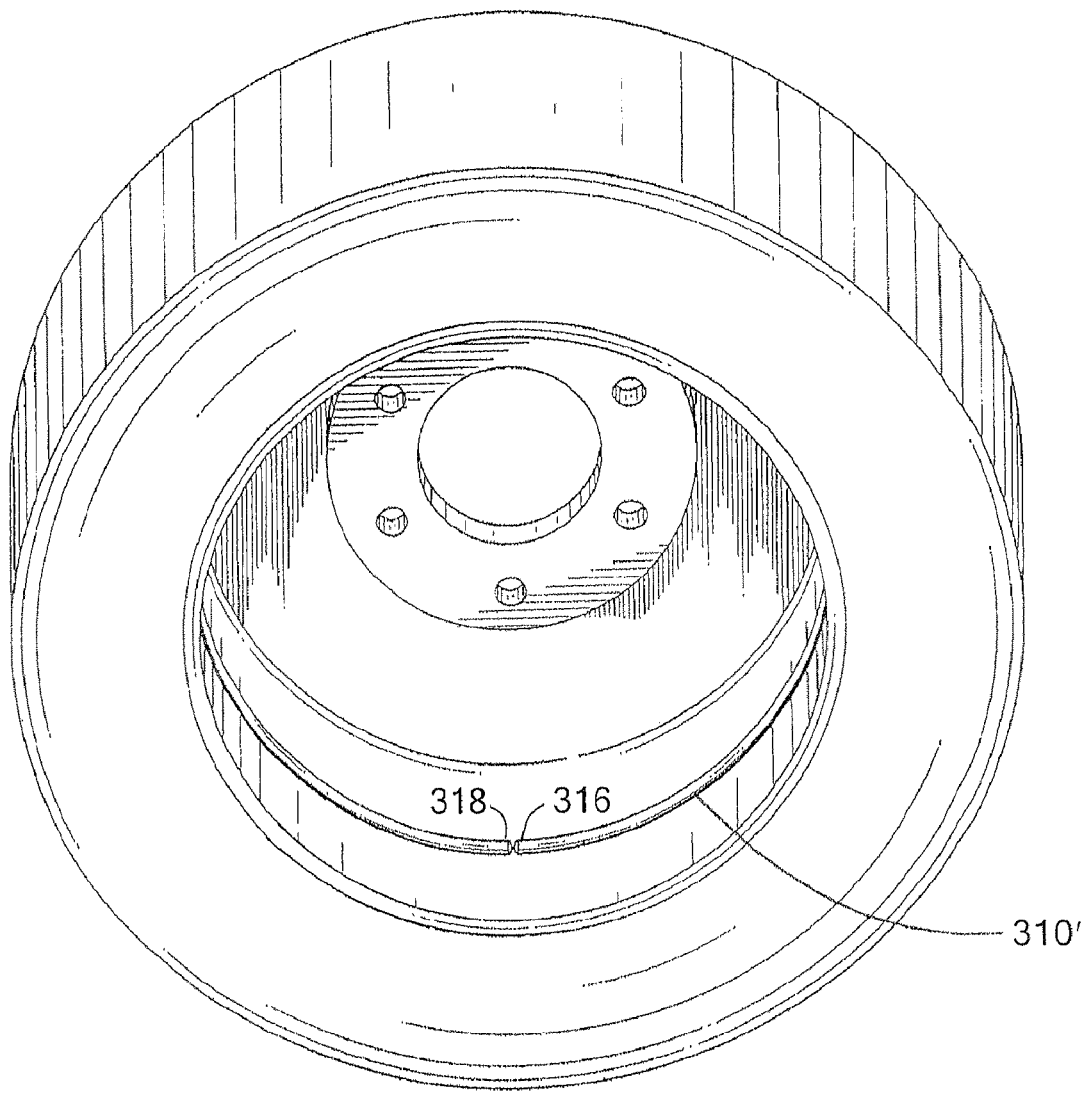
FIG. 17 is a perspective view of a stabilizer ring of the present invention as shown in FIG. 9 attached to the brake side of the tube well of a tire/wheel assembly.
Figure 18:
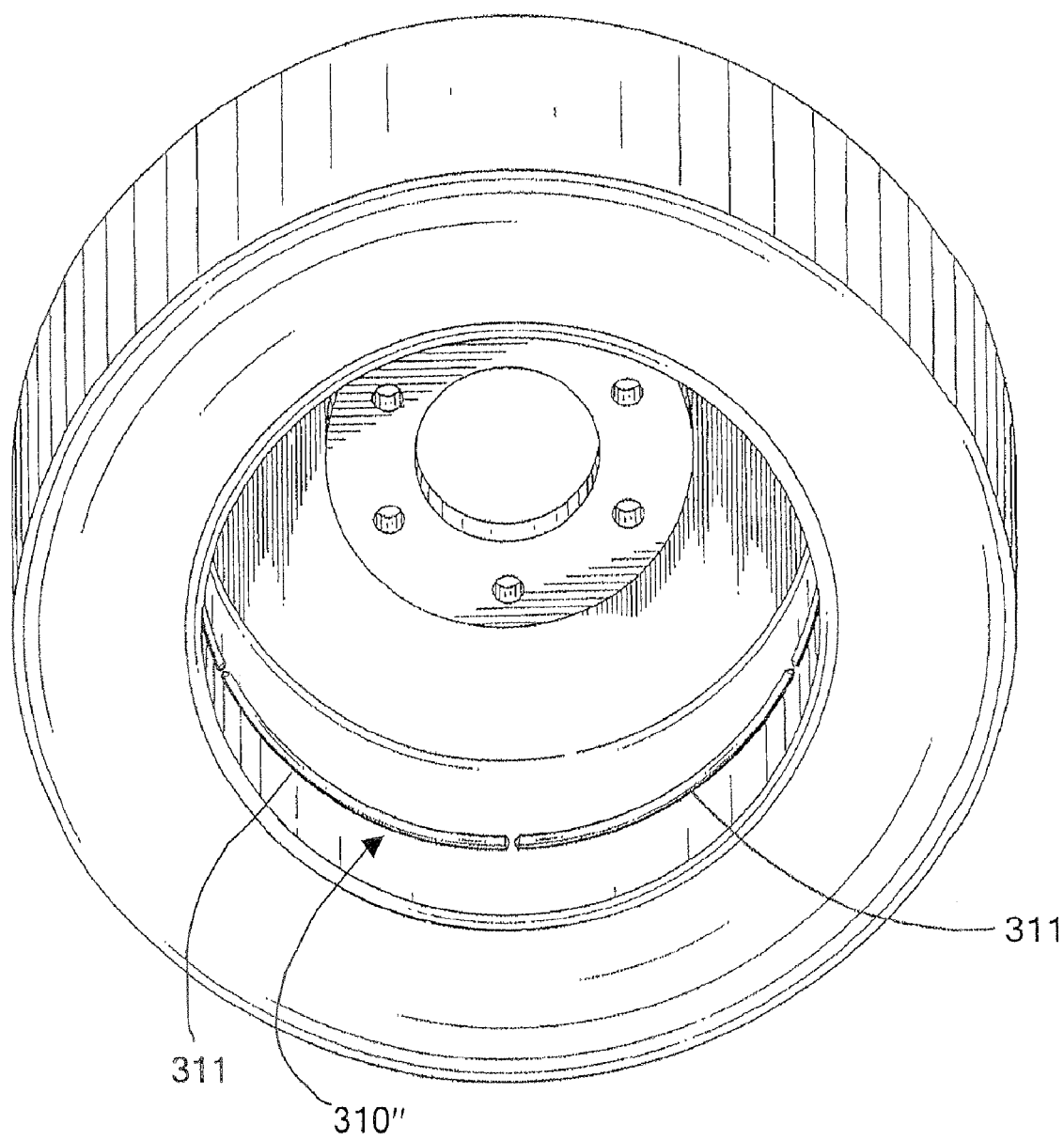
FIG. 18 is a perspective view of a stabilizer ring of the present invention as shown in FIG. 10 attached to the brake side of the tube well of a tire/wheel assembly.

FIG. 16 illustrates the step of attaching an endless version of the stabilizing ring to the wheel along one side of the marked line 346. In FIG. 17 an embodiment of the stabilizing ring 310 is shown that not a continuous ring, such as a flexible or formable longitudinal strip with a first end 316 and a second end 318, where the ends 316, 318 are approximately adjacent when the stabilizing ring is installed. For some installation locations, having a break in the ring will make assembly onto the wheel or tire easier. It is also contemplated that the stabilizing ring comprises two or more sections that form an arcuate ring when installed on the wheel or tire, as indicated in FIG. 18. A multiple-section ring may make assembly easier for some installations.

Figure 19:
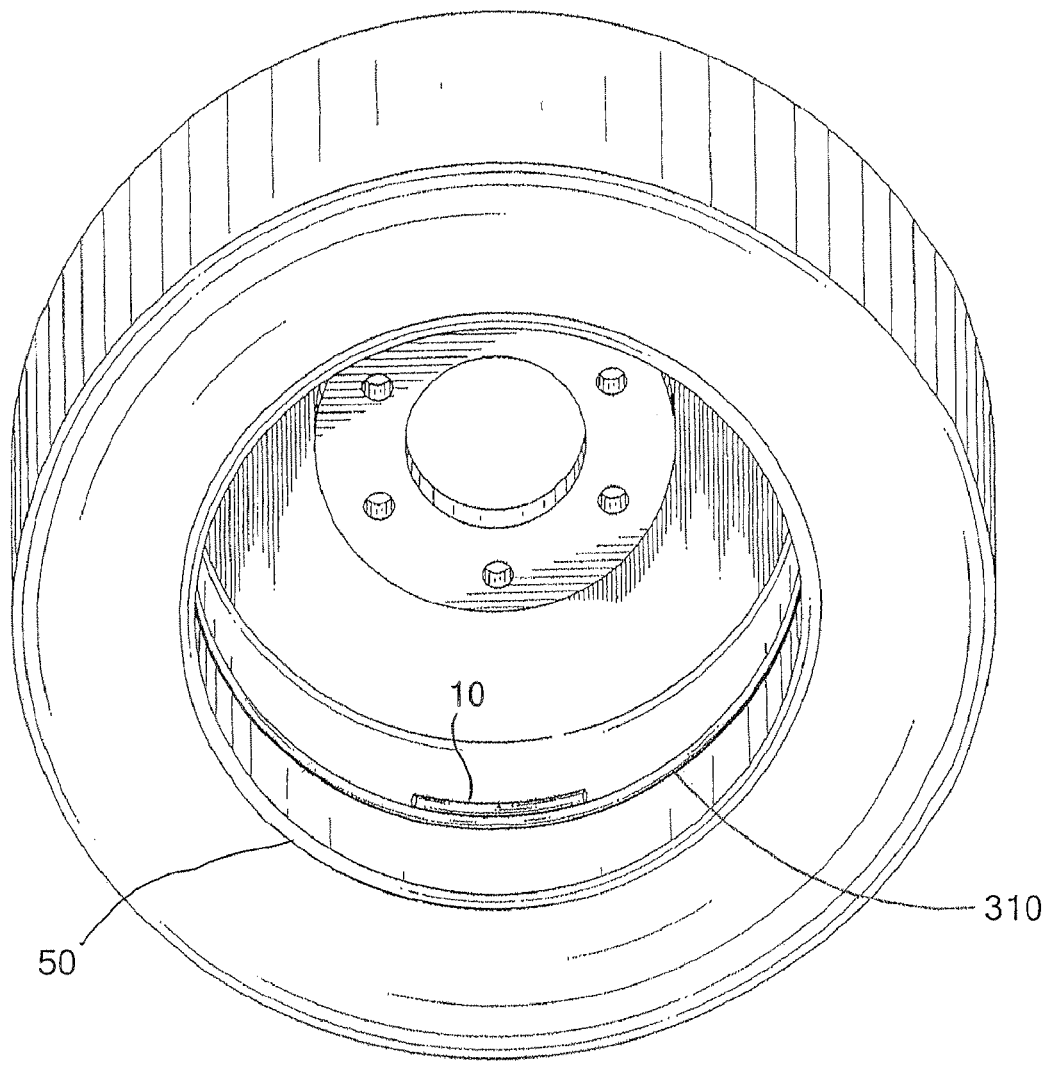
FIG. 19 is a perspective view of a stabilizer ring of the present invention as shown in FIG. 8 attached to the brake side of the tube well of a tire/wheel assembly adjacent an arcuate cartridge balance weight.
Figure 20:
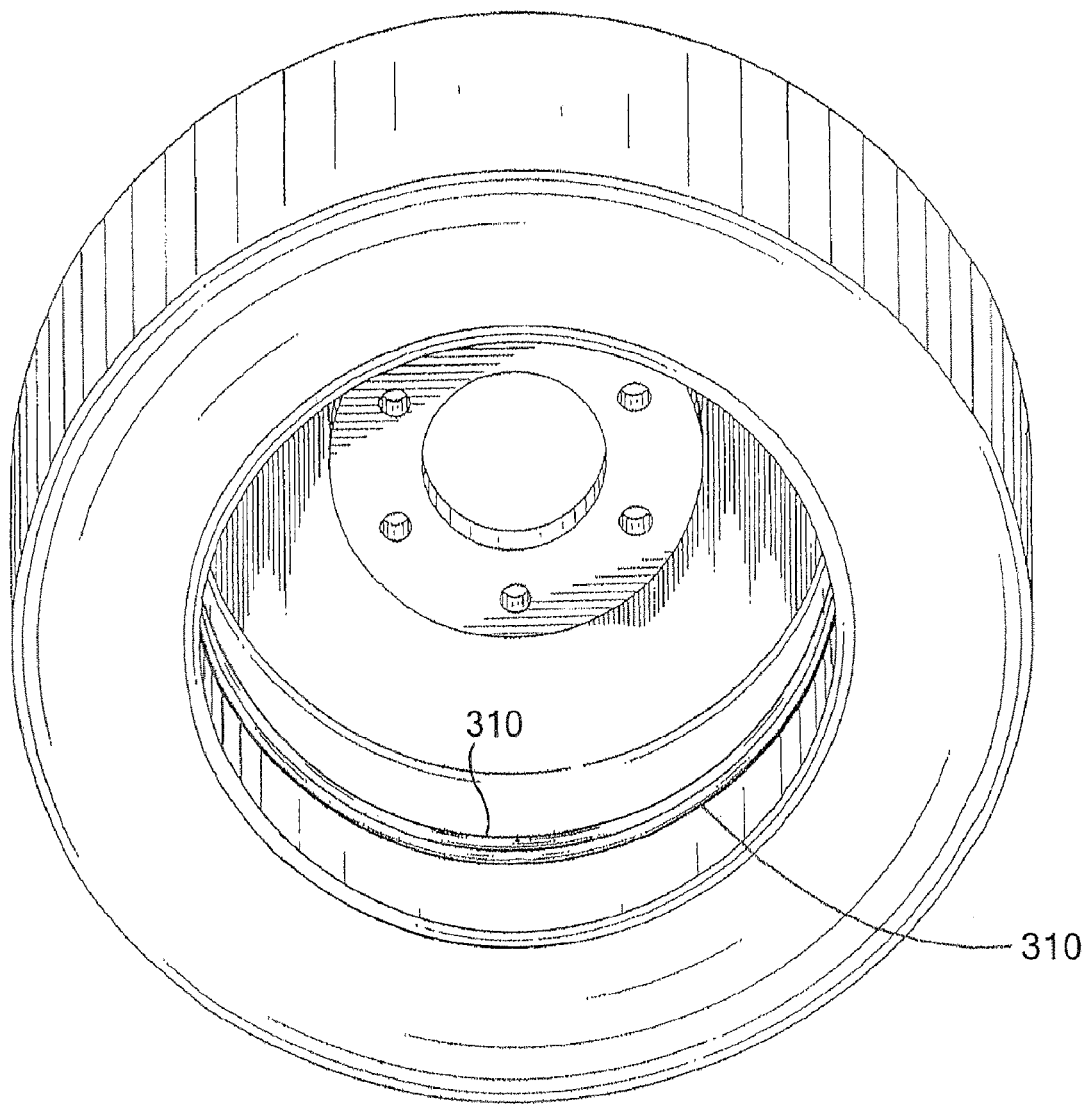
FIG. 20 shows a perspective view of two adjacent stabilizing rings of the present invention as shown in FIG. 8 attached to the brake side or non-pressurized side of the tube well of a tire/wheel assembly.

As previously mentioned, it is contemplated that the balance weight cartridge 10 may be used in conjunction with a uniformity and stabilizing system. As shown in FIG. 19, the stabilizer ring 310 is shown attached to the brake side of the tube well of a wheel 50 adjacent an arcuate cartridge balance weight 10. In FIG. 20 an embodiment is shown using a plurality of adjacent stabilizing rings attached to the brake side of the tube well of a wheel 50. This helps increase the weight of the stabilizer ring 310 when the measured force variation is especially high.

Figure 21:
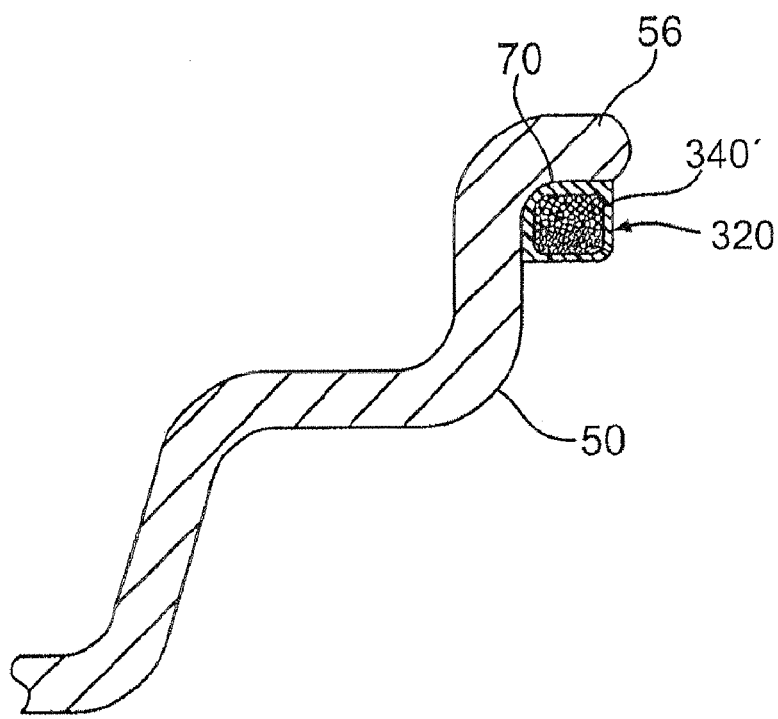
FIG. 21 is a cross-sectional view of a stabilizing ring adhesively attached to the flange of a tire/wheel assembly.
Figure 22:
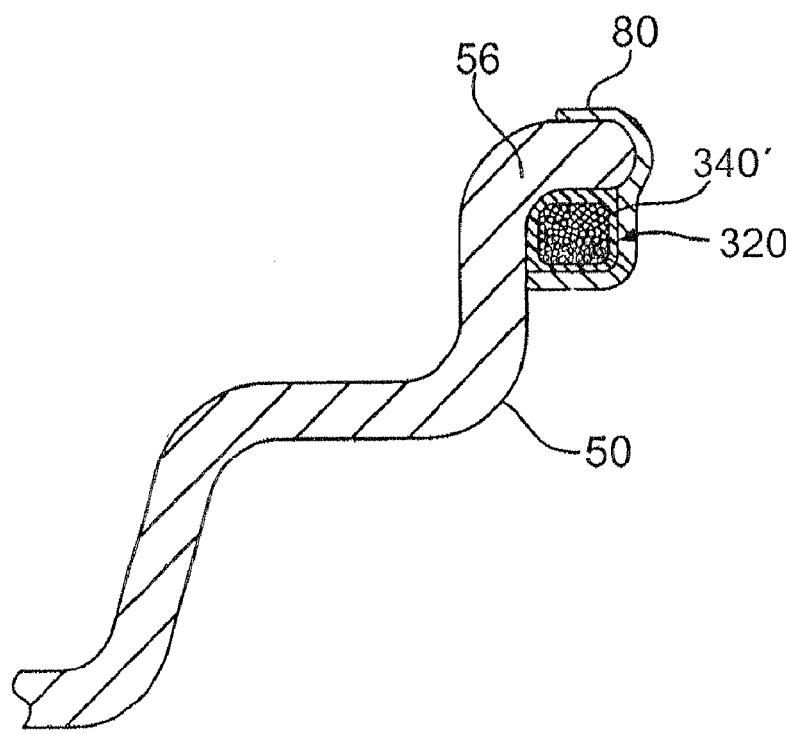
FIG. 22 is a cross-sectional view of a clip-on embodiment of the stabilizing ring shown attached to the flange of a tire/wheel assembly.

The stabilizing ring can also be attached to the wheel rim flange as previously disclosed. Referring now to FIG. 21, a cross-sectional view of a stabilizing ring adhesively attached to the flange of a tire/wheel assembly is shown. In FIG. 22, a cross-sectional view of a clip-on embodiment of the stabilizing ring is shown attached to the flange of a tire/wheel assembly.

Figure 23:
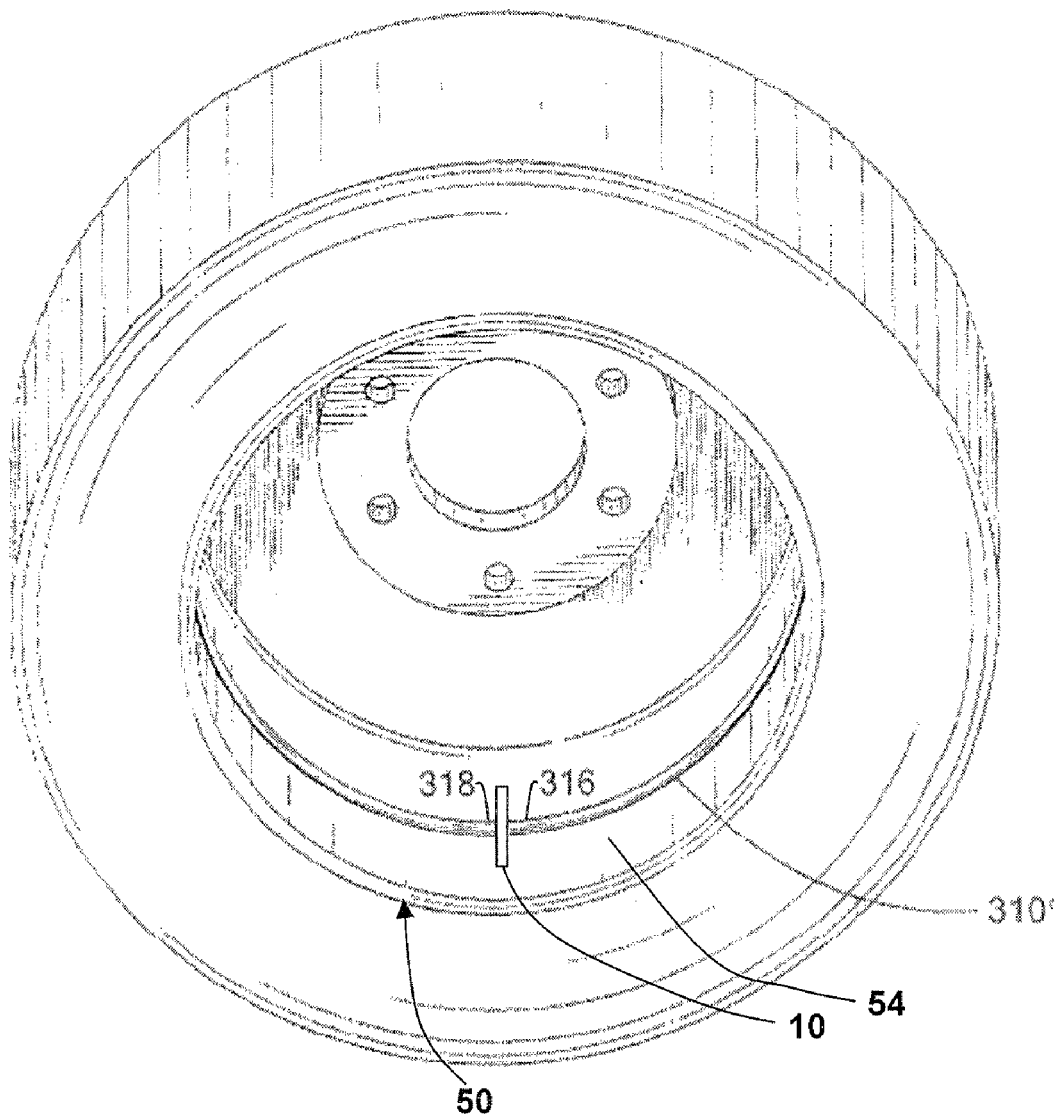
FIG. 23 is a perspective view of a stabilizer ring of the present invention attached to the brake side of the tube well of a tire/wheel assembly adjacent an axially positioned cartridge balance weight.
Figure 24:
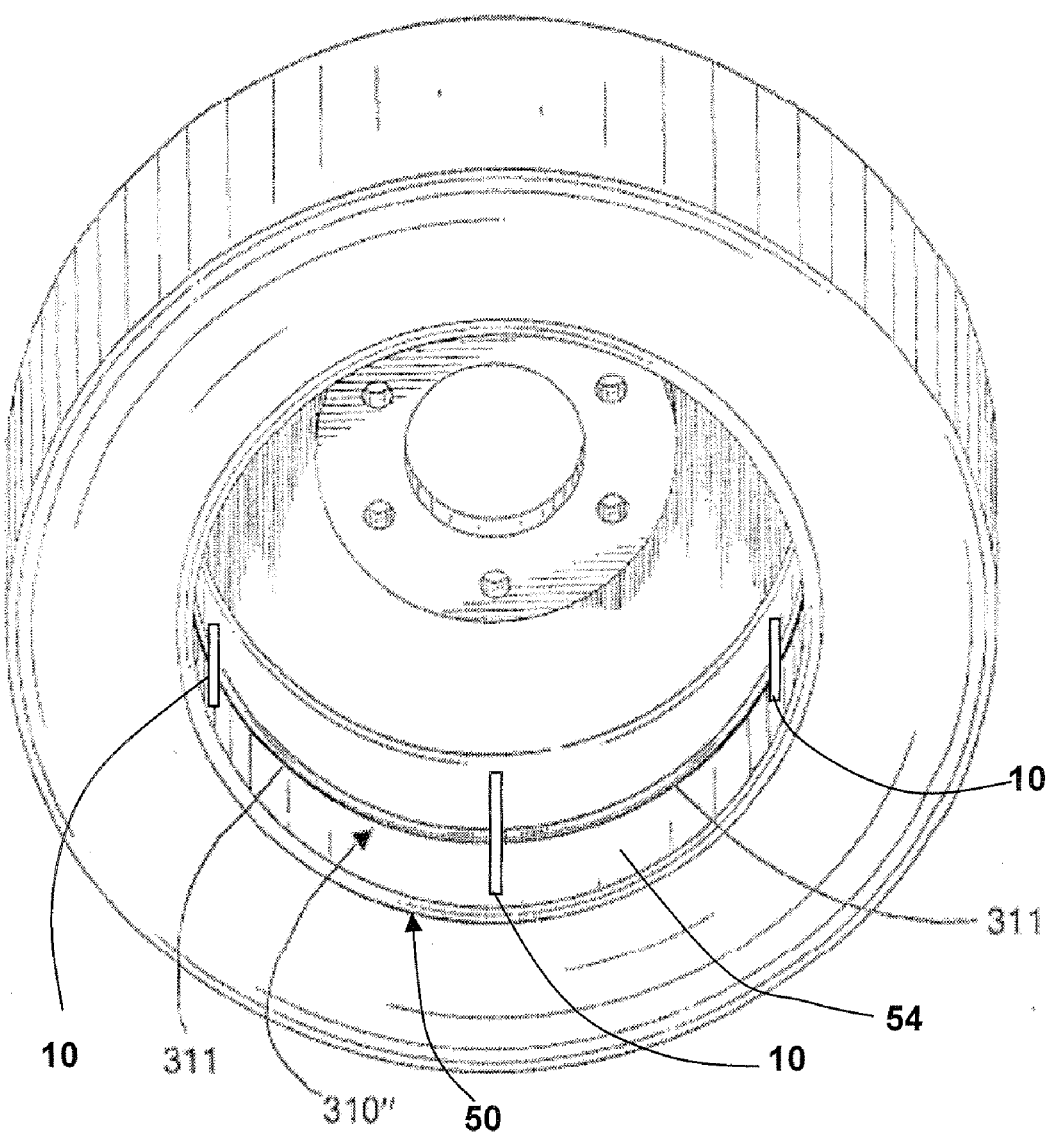
FIG. 24 is a perspective view of a stabilizer ring of the present invention as shown in FIG. 18 attached to the brake side of the tube well of a tire/wheel assembly and having a plurality of axially positioned cartridge balance weights.

In another embodiment of the invention, as exemplarily shown in FIG. 23, a weight 10 is attached to the wheel 50 such that the longitudinal centerline of the weight 10 is oblique to the radial centerline of the wheel 50. In particular, the longitudinal centerline of the weight 10 is positioned perpendicular to the radial centerline of the tire/wheel assembly 50 such that the weight 10 extends generally in an axial direction on a brake well 54 of the wheel 50. The axial positioning allows the flowable material 40 of the weight 10 to adjust within the cartridge 20 to balance forces related to couple imbalance. It is contemplated that the axially positioned weight 10 and the stabilizing ring 310 may be positioned adjacent to each other such that weight 10 is positioned between ends 316 and 318. As shown in FIG. 24, if more than one member 311 is used to make the ring, a weight 10 may be positioned between the ring members 311.

In one embodiment, the method for attaching the stabilizing ring 310 to the wheel comprises using a force variation measurement machine to determine the force variation of a tire/wheel assembly and selecting a stabilizing ring of suitable weight based on the force variation measurements. In the first step of this method, the operator uses the mount matching technique to minimize the radial force variation as discussed in the background section. In the next step, the operator balances the tire/wheel assembly using tire-balancing equipment to determine the weight amount and location of any imbalance. One or more balance weights, such as the balance weight cartridge 10, is affixed to the wheel to correct any imbalance of the tire/wheel assembly. The operator may use a wheel marking tool to assist in placing the balance weight cartridge 10. The operator then measures the radial force variation of the tire/wheel assembly using a force variation measurement machine (such as a balancer capable of measuring force variation of a tire/wheel assembly. The operator selects a stabilizing ring 310 having a total weight directly related to the force variation measurement. The operator locates the selected stabilizing ring 310 on the wheel and affixes it by using adhesive 70 or clips 80. The operator may use a wheel marking tool to assist in placing the stabilizer ring 310 when attaching the stabilizing ring 310 to the brake well of the wheel as shown in FIG. 15. The stabilizing ring 310 is shown attached adjacent a balance weight cartridge 10 in FIG. 19. It is recommended that the operator cleans the wheel as shown in FIG. 14 prior to the application of either the cartridge balance weights 10 or the stabilizing ring 310 when adhesively attaching either of these components to the brake well of the wheel.

The present invention may also be used when force variation measuring equipment is unavailable. In the first step of this method, the operator uses the mount matching technique to minimize the radial force variation by utilizing the markings on the tire and the wheel, or at least the valve position on the wheel, as discussed in the background section. In the next step, the operator balances the tire/wheel assembly using tire-balancing equipment as discussed in the previous method. Once the tire/wheel assembly is balanced, the operator selects a stabilizing ring 310 on the wheel and affixes it by using adhesive 70 or clips 80. The tire/wheel assemblies are then mounted on a vehicle and objectively tested by the driver under various driving conditions. If vibration is still present, the tire/wheel assemblies are removed and additional or heavier stabilizer rings 310 are installed.

In testing the present invention, the inventor purchased four 275/45YR19 tires for a vehicle having nineteen inch wheels. The tire/wheel assemblies were force matched using a Hunter® GPS9700 and then balanced using a balance weight cartridge 10. The tire/wheel assemblies were then mounted on a vehicle and driven under various conditions and excessive vibration was noted. The tire/wheel assemblies were then measured for force variation using a Hunter® GPS9700. The force variations readings were sixty-two pounds for the left front tire/wheel assembly, forty-two pounds for the right front tire/wheel assembly, forty-four pounds for the left rear tire/wheel assembly, and fifteen pounds for the right rear tire/wheel assembly. According to the recommended limitations of force variation published by Hunter®, three of the four tires were beyond the limits of acceptable force variation—yet the tires were publicly sold without the consumer aware that a problem existed with the tires. Each tire/wheel assembly was then fitted with a stabilizer ring 310 formed of a plastic cartridge filled with a flowable powder, the stabilizer ring weighing 5.6 ounces total. The tire/wheel assemblies were then remounted on the vehicle and driven under various conditions for 20,000 miles. No excessive vibration was noted during operation of the vehicle. The tire/wheel assemblies were then removed and measured for tread depth, which revealed even wear in all four tires. The tire/wheel assemblies were then re-measured for force variation using the Hunter® GPS9700. The force variations readings were thirty-four pounds for the left front tire/wheel assembly, twenty-two pounds for the right front tire/wheel assembly and twenty pounds for the left rear tire/wheel assembly. The right rear tire/wheel assembly was not checked as it was within force variation limits prior to testing.

Generically, a physical system is unstable if small inputs lead to large outputs, say, if ambient forces amplify little disturbances. As discussed above, the non-uniformities in the tires created an unstable system in the unsprung mass of the vehicle resulting in vibration of the vehicle. The uniformity and stabilizing system, provided by attaching a stabilizing ring 310 to each tire/wheel assembly, results in increased rotational inertia that stabilizes the unsprung mass of the vehicle. Rotational inertia is the property of matter that relates to the tendency of an object in uniform motion to remain in uniform motion. The increased stability and dampening effects provided by the stabilizing ring 310 enables the dampening of vibrations caused by non-uniformities in the tire as well as vibration from all other sources. The increased stability in the system also worked to improve the uniformity measurement of the tires by forcing the tire/wheel assemblies to run smooth which also helped provide even tread wear.

While this invention has been described with reference to preferred embodiments thereof, it shall be understood that such description is by way of illustration and not by way of limitation. Accordingly, the scope and content of the present invention are to be defined only by the terms of the appended claims.

What is claimed is:

1. A system for stabilizing force variations acting upon a tire/wheel assembly comprising:
    a wheel rim, of the tire/wheel assembly, having a tire mounting portion and a vehicle mounting portion;
    a tire, of the tire/wheel assembly, mounted on the tire mounting portion of the wheel rim; and
    at least one annular ring comprising at least one cartridge having an interior chamber that is generally completely filled with a flowable weight material, the annular ring having an approximately constant mass around its circumference when filled with the flowable weight material, and being affixed to the wheel rim such that the annular ring and the wheel are coaxial, wherein the annular ring has a height extending in a radial direction of the wheel rim a distance less than a radially extending distance of the wheel rim between the tire mounting portion and the vehicle mounting portion.

2. The stabilizing system of claim 1, wherein the annular ring has a first end positioned next to a second end when the annular ring is affixed to the wheel.

3. The stabilizing system of claim 1, wherein the cartridge comprises two or more interior chambers.

4. The stabilizing system of claim 1, further comprising:
    an adhesive for attaching the annular ring to the wheel.

5. The stabilizing system of claim 1, wherein the flowable weight material comprises a form selected from the group consisting of a powder, particles, granules, balls, shot, and beads.

6. The stabilizing system of claim 5, wherein the flowable weight material comprises a ceramic material, a glass material, a polymeric material, or a metallic material.

7. The stabilizing system of claim 1, further comprising:
    a balance weight attached to the wheel.

8. The stabilizing system of claim 1, wherein the annular ring comprises two or more sections that form a ring when affixed to the wheel.

9. The stabilizing system of claim 1, wherein the annular ring comprises two or more co-axial chambers, the chambers being positioned at different locations along the axis of the wheel.

10. The stabilizing system of claim 7, wherein the balance weight further comprises:
    a cartridge comprising an interior chamber partially filled with a flowable weight material.

11. The stabilizing system of claim 7, wherein the balance weight further comprises:
    a means for attaching the cartridge to the wheel.

12. A method of stabilizing force variations acting upon a tire/wheel assembly comprising the steps of:
    providing a tire/wheel assembly, the tire/wheel assembly comprising: a wheel rim having a tire mounting portion and a vehicle mounting portion, and a tire mounted on the tire mounting portion of the wheel rim;
    providing at least one annular ring comprising at least one cartridge having an interior chamber that is generally completely filled with a flowable weight material, the stabilizing ring having an approximately constant mass around its circumference when filled with the flowable weight material, wherein the annular ring has a height extending in a radial direction of the wheel rim a distance less than a radially extending distance of the wheel rim between the tire mounting portion and the vehicle mounting portion; and
    attaching the annular ring to the wheel to reduce force variations arising during operation of the tire/wheel assembly.

13. The method of claim 12, wherein the step of attaching the annular ring to the wheel is accomplished using an adhesive or one or more clips.

14. The method of claim 12, wherein the at least one annular ring comprises a chamber completely filled with a flowable weight material.

15. The method of claim 12 further comprising the step of:
    attaching the balance weight to a non-pressurized side of a tubewell of the wheel or a rim flange of the wheel.

16. The method of claim 12 further comprising the step of:
    identifying a tire/rim assembly having force variations.

17. The method of claim 12, wherein the annular ring has a first end positioned next to a second end when the annular ring is affixed to the wheel.

18. A system for stabilizing force variations acting upon a tire/wheel assembly comprising a wheel rim and a tire, the system comprising:

at least one annular ring comprising at least one cartridge having an interior chamber that is generally completely filled with a flowable weight material, the annular ring having an approximately constant mass around its circumference when filled with the flowable weight material, and being attachable to a wheel rim of the tire/wheel assembly such that the annular ring and the wheel are coaxial, wherein the annular ring has a height extending in a radial direction of the wheel rim a distance less than a radially extending distance of the wheel rim between a tire mounting portion of the wheel rim and a vehicle mounting portion of the wheel rim.

19. The stabilizing system of claim 18, wherein the annular ring has a first end positioned next to a second end when the annular ring is affixed to the wheel.

20. The stabilizing system of claim 19, wherein the annular ring comprises two or more sections that form a ring when affixed to the wheel.

* * * * *